(12) United States Patent
Prasannakumar et al.

(10) Patent No.: US 12,238,164 B2
(45) Date of Patent: Feb. 25, 2025

(54) CONTROL PLANE FOR CLOUD SERVICE WORKLOADS ACCESSING DATACENTER STORAGE

(71) Applicant: Dell Products L.P., Round Rock, TX (US)

(72) Inventors: Pooja P. Prasannakumar, Bangalore (IN); William J. Elliott, IV, Holden, MA (US); Bahubali Jain, Kalaburgi (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/142,051

(22) Filed: May 2, 2023

(65) Prior Publication Data

US 2024/0372913 A1  Nov. 7, 2024

(51) Int. Cl.
*H04L 67/1012* (2022.01)
*H04L 67/1027* (2022.01)
*H04L 67/1097* (2022.01)

(52) U.S. Cl.
CPC ...... *H04L 67/1012* (2013.01); *H04L 67/1027* (2013.01); *H04L 67/1097* (2013.01)

(58) Field of Classification Search
CPC ............. H04L 67/1012; H04L 67/1027; H04L 67/1097

USPC ................. 709/203, 217, 218, 219
See application file for complete search history.

(56) References Cited

U.S. PATENT DOCUMENTS

| 10,956,346 | B1 * | 3/2021 | Ben-Yehuda | G06F 13/4027 |
| 11,611,573 | B1 * | 3/2023 | Ithal | H04L 63/083 |
| 11,748,505 | B2 * | 9/2023 | Panigrahi | G06F 21/57 726/30 |
| 2013/0061089 | A1 * | 3/2013 | Valiyaparambil | G06F 8/658 714/15 |
| 2022/0137845 | A1 * | 5/2022 | Crowley | G06F 3/067 710/38 |

FOREIGN PATENT DOCUMENTS

CN      109513206 A  *  3/2019  ............ A63F 13/30

* cited by examiner

*Primary Examiner* — Liang Che A Wang
(74) *Attorney, Agent, or Firm* — Terrile, Cannatti & Chambers, LLP; Emmanuel A. Rivera

(57) ABSTRACT

Described herein are systems and methods that provide access of a cloud service workload to data of storage devices. A control plane identifies one or more arrays of the storage devices as to what the workload needs access. Discovering is performed by the control plane as to data access of the cloud service to the storage devices. Cloud service accounts which include compute resources used by the workload are identified by the control plane. The control plane provides access to the workload and the compute resources to the data using the data access of the cloud service.

15 Claims, 4 Drawing Sheets

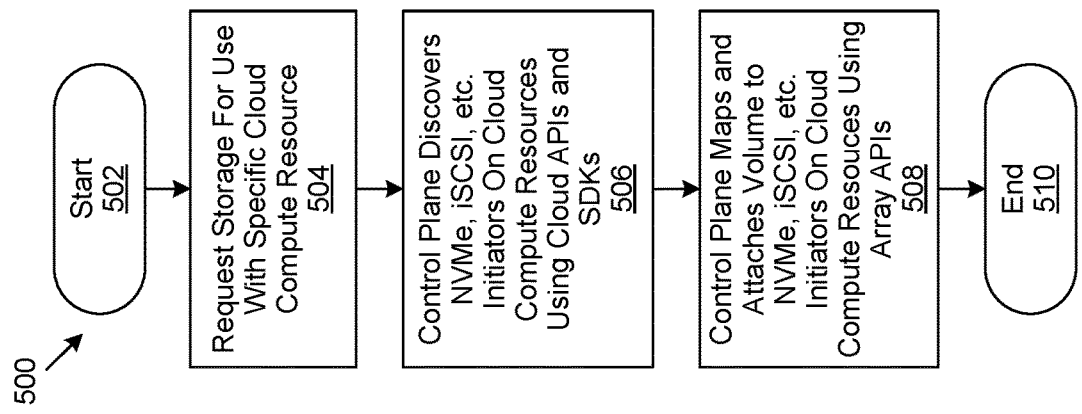
*Figure 5*
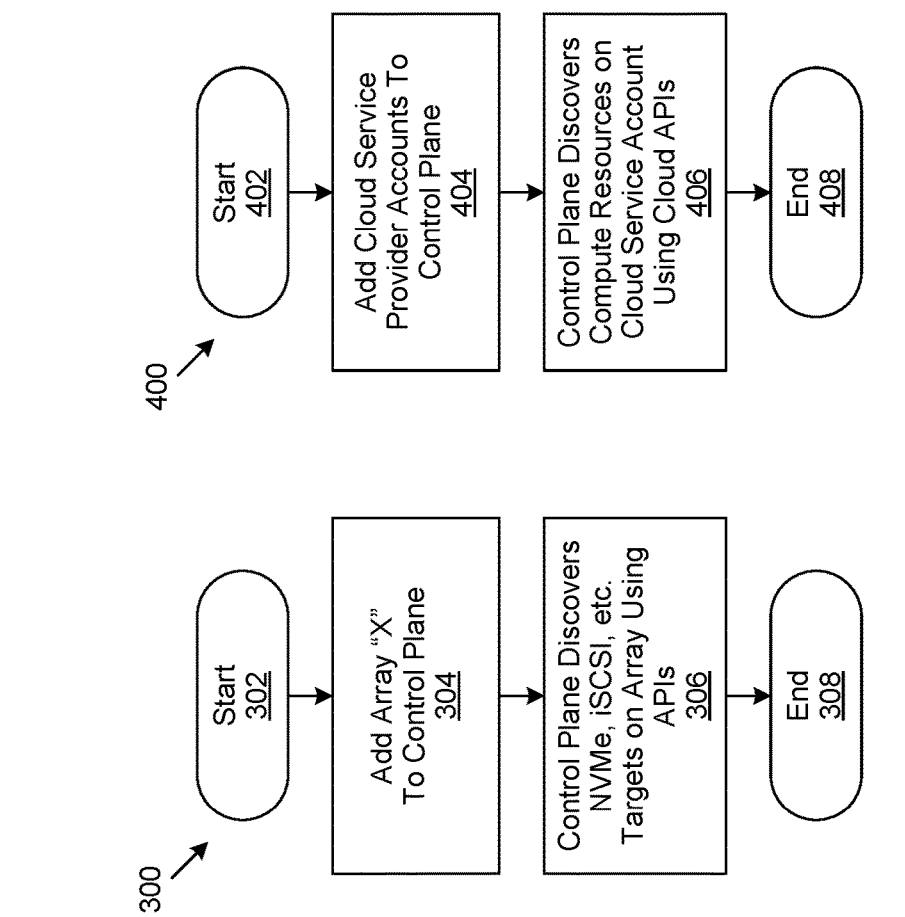
*Figure 4*
*Figure 3*

CONTROL PLANE FOR CLOUD SERVICE WORKLOADS ACCESSING DATACENTER STORAGE

BACKGROUND OF THE INVENTION

Field of the Invention

The present invention relates to container-based applications running on information handling systems. More specifically, embodiments of the invention provides for a control plane in a datacenter to allow access of cloud service workloads/applications to access/use storage in the datacenter.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may use cloud services to provide applications. Cloud services operating as public clouds host applications which are used by information handling systems. An information handling system can access and make use of multiple cloud services. Application running on cloud service include software code that is initiated when triggered by events at an information handling system. If the applications need to access data from a persistent data storage, such applications are limited to the run on compute resources that can access that persistent storage. This can limit the application to only run on the cloud service that which can access the persistent storage.

Different cloud services can provide different data protection mechanisms. Each cloud service can provide different methods of storing data as used/consumed by information handling systems. Such data can be managed by the different cloud services through their unique consoles and interfaces. Merging data management of the different cloud services can be a difficult, if not impossible, task.

Enterprises (e.g., companies) using multiple information handling systems can utilize multiple different cloud services. Multiple cloud services imply multiple stacks for management of data, data protection, security scans, data cataloging, etc. Each cloud service uses a different stack for data protection and data management (e.g., security scans, cataloging, custom tagging, etc.). Enterprises have to align with these different stacks, implying different strategies for backup, data replication, application disaster recovery, based on which cloud service an application is running on.

In certain cases, an enterprise desires to move an application running on one cloud service to another cloud service. Migrating or cloning applications from one cloud service to another cloud service could be for risk mitigation, disaster recovery, availability requirements, cost differences, etc. Because of the different data management methods used by the different cloud services, it can be a difficult task for enterprise to move/clone applications. For example, an enterprise would have to work with different cloud service account application program interfaces (API) to move workloads and their data from one cloud to another. Therefore, enterprises may be reluctant to move/clone applications from one cloud service to another cloud service due to data residency requirements and security concerns.

SUMMARY OF THE INVENTION

A computer-implementable method, system and computer-readable storage medium for providing access of cloud service workload to data of storage devices comprising identifying by a control plane one or more arrays of the storage devices as to what the workload needs access; discovering by the control plane data access of the cloud service to the storage devices; identifying by the control plane cloud service accounts which include compute resources used by the workload; providing by the control plane access to the workload and the compute resources to the data using the data access of the cloud service.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 illustrates generalized flowchart for an administrator information handling system to add storage arrays and application program interfaces;

FIG. 4 shows a generalized flowchart for an administrator information handling system to add credentials of a cloud service;

FIG. 5 shows a generalized flowchart to allow an administrator information handling system to define an application to run a specific cloud service.

DETAILED DESCRIPTION

Described herein are systems and methods that provide for a control plane at a customer on premise data center or a co-located data center. The control plane interfaces with storage devices of the data center, and with cloud services that provide applications to information handling systems of the customer. The control plane allows applications running on multiple cloud services to access data from the storage devices. The control plane/data center can have direct connection to the cloud services via a tunnel (e.g., VPN) or direct connections, such as AWA DirectConnect, Azure ExpressRoute, Google Cloud InterConnect, etc. Compute resources (e.g., virtual machines) of the cloud services can access data on the storage device through iSCSI, NVMe-o-TCP, etc. over a lowlatency, secure tunnel between a cloud service and the data center.

Figure 1:
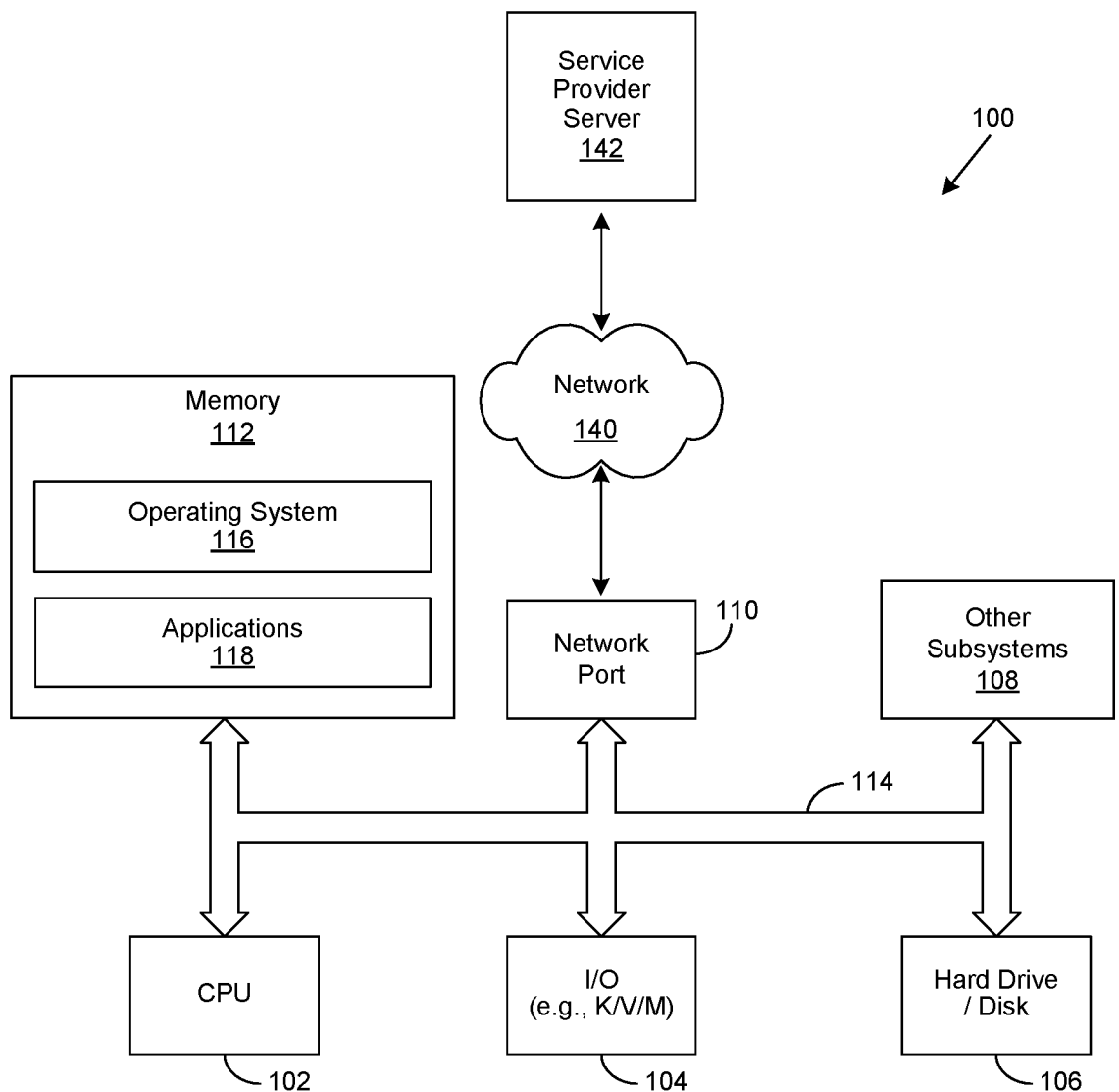
FIG. 1 is a general illustration of components of an information handling system as implemented in the present invention.

FIG. 1 is a generalized illustration of an information handling system (IHS) 100 that can be used to implement the system and method of the present invention. In particular, implementations provide for container orchestration systems and their components (e.g., container based applications), such as Kubernetes, to run on IHS 100.

The information handling system (IHS) 100 includes a processor (e.g., central processor unit or "CPU") 102, input/output (I/O) devices 104, such as a microphone, a keyboard, a video display or display device, a mouse, and associated controllers (e.g., K/V/M), a hard drive or disk storage 106, and various other subsystems 108.

In various embodiments, the information handling system (IHS) 100 also includes network port 110 operable to connect to a network 140, where network 140 can include one or more wired and wireless networks, including the Internet. Network 140 is likewise accessible by a service provider server 142.

The information handling system (IHS) 100 likewise includes system memory 112, which is interconnected to the foregoing via one or more buses 114. System memory 112 can be implemented as hardware, firmware, software, or a combination of such. System memory 112 further includes an operating system (OS) 116, and one or more application(s) 118.

Figure 2:
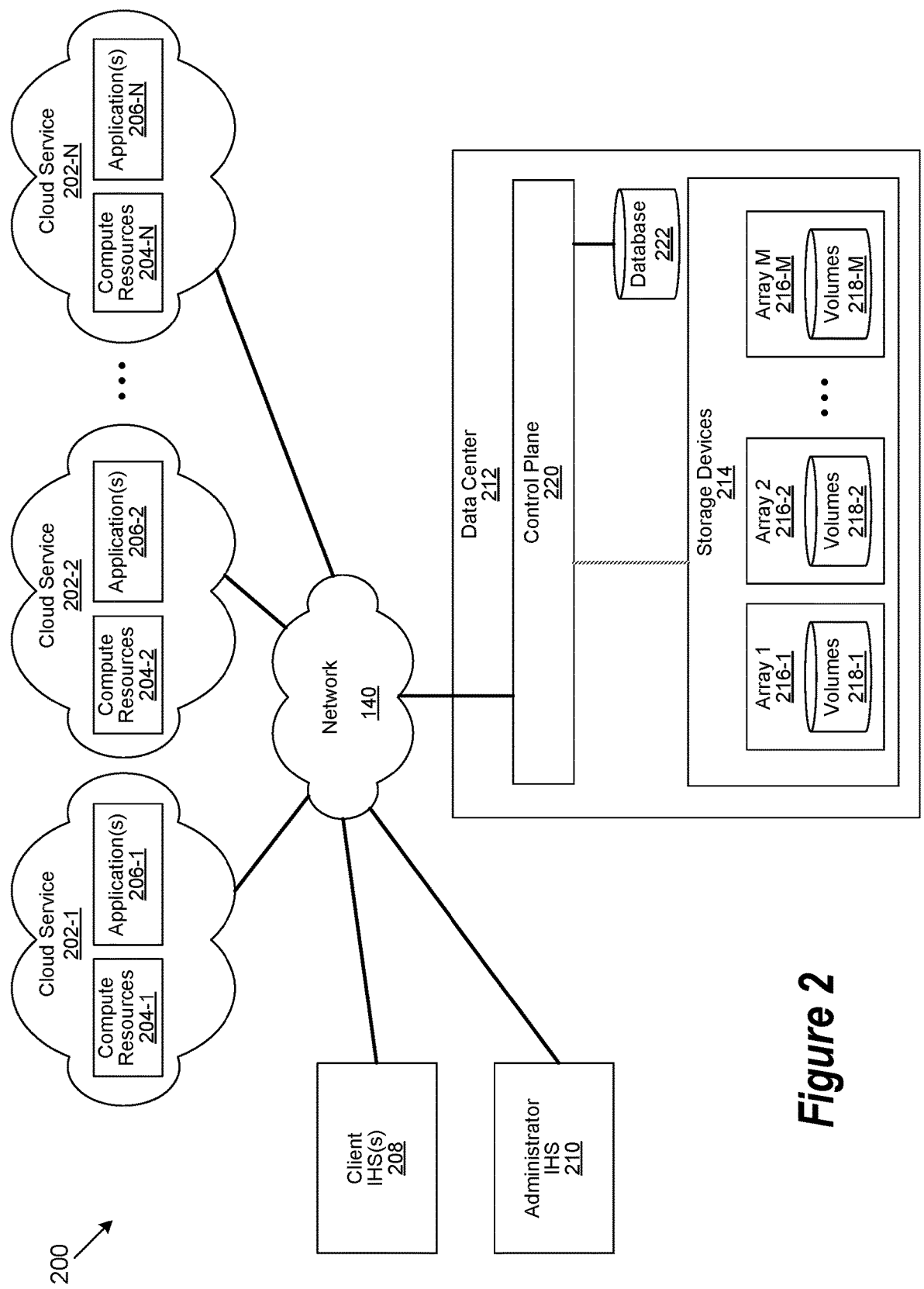
FIG. 2 illustrates a system as implemented in the present invention.

FIG. 2 illustrates a system 200 as implemented in the present invention. System 200 includes multiple cloud services 202-1 to 202-N. Cloud services 202 can be considered as accessible public clouds. Examples of cloud services 202 include AWS (Amazon Web Services), Microsoft Azure, Google Cloud, etc. Implementations provide for cloud services 202 to include compute resources 204, such as virtual machines and applications 206. The applications 206 can be different applications, and in certain cases are the same application that is migrated or cloned (replicated) from one cloud service 202 to another cloud service 202.

Cloud services 202 can be implemented as cloud computing, and can make use of one or more information handling systems such as described in FIG. 1.

The system 200 includes network 140 as describe in FIG. 1, where network 140 can include one or more wired and wireless networks, including the Internet. Network 140 connects cloud services with other elements of the system 200. Other elements of system 200 are also connected to one another through network 140.

The system includes one or more client information handling system(s) 208. The information handling system 208 can be implemented as an information handling system 100 described in FIG. 1. In particular, the information handling systems 208 access cloud services 202 and use applications 206. Applications 206 and compute resources 204 can be offered by the cloud services 202 as infrastructure as a service.

The system 200 further includes an administrator information handling system 210. Implementations provide for information handling system(s) 208 and administrator information handling system 210 to be part of an enterprise or customer infrastructure.

Implementations provide for the system to include a data center 212. The data center can be part of an enterprise or customer infrastructure, and considered as an on premise data center. In certain implementations the data center 212 can be a co-located data center, such as provided by Equinix.

The data center 212 includes storage devices 214. Storage devices 214 can be provided and supported by a provider/vendor to an enterprise or customer. The storage devices 214 include one or more data arrays 216-1 to 216-M. Data arrays 216 respectively include volumes 218 for data storage. In particular data stored in volumes is used/accessed by cloud services 202 for client IHS(s) 208. For example, an application 206-2 of cloud service 202-2 may use/access data in volumes 218-1 of array 1 216-1. An application 206-1 in cloud service 202-1 may use/access data in other volumes of 218-1 of array 1 216-1.

In the event when an application 206 migrated/cloned from one cloud service 202 to another cloud service 202, that application 206 would use/access the same data in the same volumes 218. For example, if a particular application 206-2 is migrated from cloud service 202-2 to cloud service 202-1, the migrated application 206 (i.e., new application 206-1) will access/use the same data in the same volumes 218 as the original application 206-2. In other words, as workload/application 206) is moved/migrated from one cloud service 202 to another, the data remains the same on volumes 218.

A control plane 220 is provided in data center 212, and is used to interface with storage devise 216 and cloud services 202. The control plane is further configured to access a database 222. The control plane 220 provides an interface for administrator information handling system 210 to onboard storage arrays 216 to be used with multiple cloud services 202 (i.e., cloud service 202 accounts), as well as onboarding cloud services 202 (i.e., cloud service accounts).

The control plane 220 discovers details of storage arrays 216, as well as details of hosts in the cloud services 202. Therefore, the implementation of the control plane 220 allows an enterprise (i.e., customer) to avoid having to use storage provided by each of the different cloud services, and define separate disaster recovery (DR), backup, and replication strategies data in environment for each cloud service 202. If an enterprise (i.e., customer) attempts to use storage they own or have accessed to, with workloads/applications 206 of the cloud services 202, the enterprise may have to use disparate, custom tools to get initiator details of hosts in each cloud service 202 (i.e., cloud service 202 account). Furthermore, the enterprise may have to map, provision, and attach volumes 218 from storage arrays 216 to the hosts. Different and separate tools may also be needed in reconfiguring storage mapping if the workload/application 206 were to be migrated to a different cloud service 202.

FIG. 3 shows a generalized flowchart 300 for an administrator information handling system 210 to add storage arrays 216 and application program interfaces. FIG. 4 shows a generalized flowchart 400 for an administrator information handling system 210 to add credentials of a cloud service 202. FIG. 5 shows a generalized flowchart 500 to allow an administrator information handling system 210 to define an application to run a specific cloud service 202.

The order in which the processes are described is not intended to be construed as a limitation, and any number of the described method steps may be combined in any order to implement the method, or alternate method. Additionally, individual steps may be deleted from the method without departing from the spirit and scope of the subject matter described herein.

The control plane 220 allows the administrator information handling system 210 to define which particular arrays 216 to use with specific cloud services 202. At step 302, the process 300 starts. At step 304, the administrator information handling system 210 adds an array 216 or more than one array 216 to the control plane 210. At step 306, the control plane 220 discovers data access on the storage devices 214 as to iSCSI, NVMe-o-TCP, etc. targets on the array(s) 216, using the APIs of the array(s) 216. This information is persisted to database 222. At step 308, the process 300 ends.

If an application 206 is desired run on a particular cloud service 202, the application needs to access data on a specific array(s) 216. The details of the particular cloud service 202 are added to control plane 220. At step 404, cloud service 202 accounts are added to control plane 220. A cloud service 202 account has multiple compute resources 204, such as virtual machines/hosts. At step 406, the control plane 220 discovers the compute resources 204 (virtual machines/hosts) using the cloud service 202 API. The information as to the discovered compute resources 204 is persisted to the database 222 to allow the control plane 220 to know what compute resources 204 are available. At step 408, the process 400 ends.

The administrator information handling system 210 may desire to run a specific application 206 on a particular cloud service 202. For example, an application developer of an enterprise may need to deploy an application 206 into a cloud service 202. At step 504, a request is made from administrator information handling system 210 through the control plane 220 for storage for use with specific compute resources 204 (virtual machines/hosts). For example, an application 206 may need a particular amount of storage, such a 2 TB. At step 506, using cloud service 202 APIs or software development kits (SDKs), the control plane 220 discovers NVMe, iSCSI, etc. initiators on cloud service 202 compute resources 204 (virtual machines/hosts). At step 508, using array 216 APIs, the control plane 220 maps and attaches volume(s) 218 to NVMe, ISCSI, etc. initiators on cloud service 202 compute resources 204 (virtual machines/hosts). At step 510, the process 500 ends.

Figure 6:
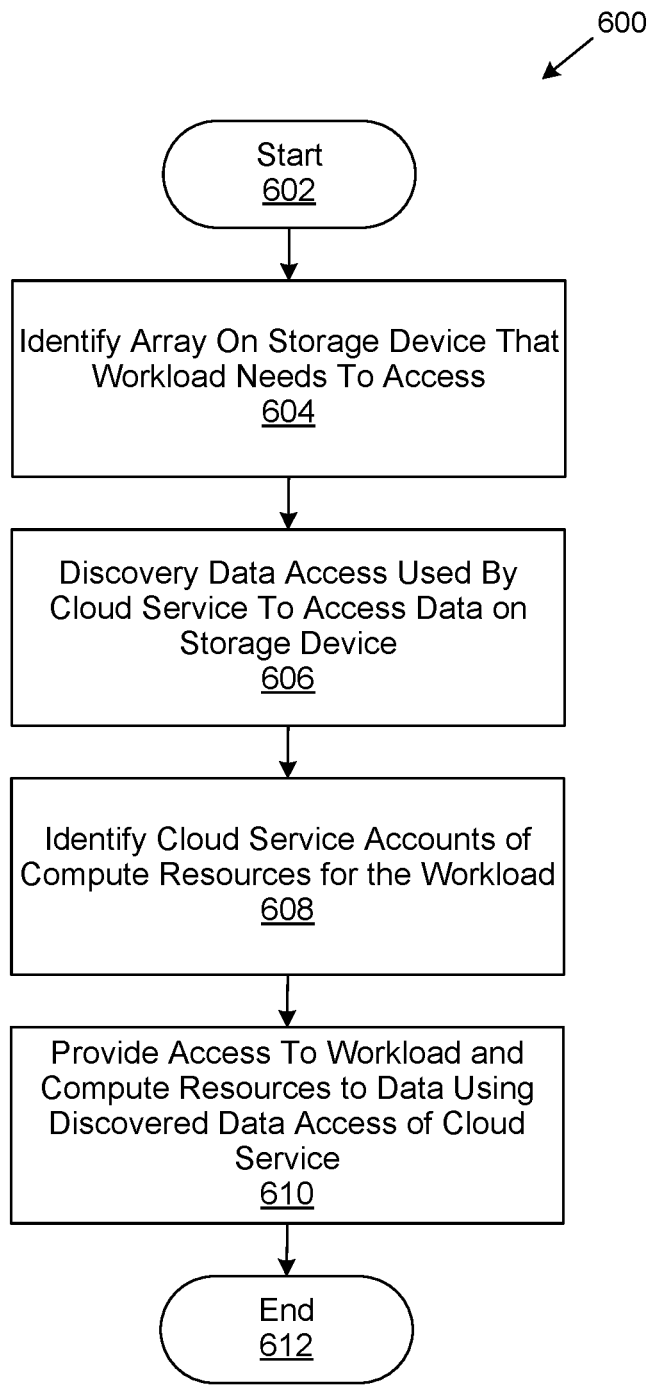
FIG. 6 shows a generalized flowchart for providing access of cloud service workloads to data of storage devices.

FIG. 6 shows a generalized flowchart for providing access of cloud service workloads to data of storage devices. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 602, the process 600 starts. At step 604, the control plane 210 identifies array(s) 216 of storage devices 214 as to what a workload/application 206 of a of cloud service 202 needs access to.

At step 606, the control plane 210 discovers the data access of the cloud service 202 to the storage devices 214, such as iSCSI, NVMe-o-TCP, etc. targets on the array(s) 216. The discovery could be through the APIs of the array(s) 216.

At step 608, the control plane 210 identifies cloud service 202 accounts which include compute resources 204 (virtual machines/hosts) used by the workload/application 206.

At 610, the control plane 210 provides access to the workload/application and compute resources 204 (virtual machines/hosts) to the data using the data access of the cloud service 202. At step 612, the process 600 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for providing access of cloud service workload to data of storage devices comprising:
    identifying by a control plane implemented in a data center, one or more arrays of the storage devices as to what the workload needs access, wherein the workload is related to applications running on the cloud service, wherein the control plane provides an interface to onboard the one or more arrays and cloud services to be used with the one or more arrays;
    discovering by the control plane data access of the cloud service to the storage devices by specific APIs of the arrays;
    adding details as to data access and hosts of the cloud service to the control plane, wherein data access is either through iSCSI or NVMe-o-TCP;
    onboarding and providing the one or more arrays to be used by multiple cloud services;
    identifying by the control plane cloud service accounts which include compute resources used by the workload, wherein the control plane is used to define disaster recovery, backup, and replication strategies data for the computer resources, wherein the compute resources are persisted to a database accessible by the control plane;
    providing by the control plane access to the workload and the compute resources to the data using the data access of the cloud service.

2. The computer-implementable method of claim 1, wherein the storage devices are located in the data center.

3. The computer-implementable method of claim 1, wherein an administrator information handling system defines the one or more one or more arrays of the storage devices accesses.

4. The computer-implementable method of claim 1, wherein cloud service workload is migrated or cloned to another cloud service, and accesses the same arrays of the storage devices.

5. The computer-implementable method of claim 1, wherein the control plane maps and attaches volumes initiators of the compute resources.

6. A system comprising:
    a plurality of processing systems communicably coupled through a network, wherein the processing systems include non-transitory, computer-readable storage medium embodying computer program code interacting with a plurality of computer operations for providing access of cloud service workload to data of storage devices comprising:
    identifying by a control plane implemented in a data center, one or more arrays of the storage devices as to what the workload needs access, wherein the workload is related to applications running on the cloud service, wherein the control plane provides an interface to onboard the one or more arrays and cloud services to be used with the one or more arrays;
    discovering by the control plane data access of the cloud service to the storage devices by specific APIs of the arrays;
    adding details as to data access and hosts of the cloud service to the control plane, wherein data access is either through iSCSI or NVMe-o-TCP;
    onboarding and providing the one or more arrays to be used by multiple cloud services;
    identifying by the control plane cloud service accounts which include compute resources used by the workload, wherein the control plane is used to define disaster recovery, backup, and replication strategies data for the computer resources, wherein the compute resources are persisted to a database accessible by the control plane;
    providing by the control plane access to the workload and the compute resources to the data using the data access of the cloud service.

7. The system of claim 6, wherein the storage devices are located in the data center.

8. The system of claim 6, wherein an administrator information handling system defines the one or more one or more arrays of the storage devices accesses.

9. The system of claim 6, wherein cloud service workload is migrated or cloned to another cloud service, and accesses the same arrays of the storage devices.

10. The system of claim 6, wherein the control plane maps and attaches volumes initiators of the compute resources.

11. A non-transitory, computer-readable storage medium embodying computer program code for providing access of cloud service workload to data of storage devices, the computer program code comprising computer executable instructions configured for:
    identifying by a control plane implemented in a data center, one or more arrays of the storage devices as to what the workload needs access, wherein the workload is related to applications running on the cloud service, wherein the control plane provides an interface to onboard the one or more arrays and cloud services to be used with the one or more arrays;

discovering by the control plane data access of the cloud service to the storage devices by specific APIs of the arrays;

adding details as to data access and hosts of the cloud service to the control plane, wherein data access is either through iSCSI or NVMe-o-TCP;

onboarding and providing the one or more arrays to be used by multiple cloud services;

identifying by the control plane cloud service accounts which include compute resources used by the workload, wherein the control plane is used to define disaster recovery, backup, and replication strategies data for the computer resources, wherein the compute resources are persisted to a database accessible by the control plane;

providing by the control plane access to the workload and the compute resources to the data using the data access of the cloud service.

12. The non-transitory, computer-readable storage medium of claim 11, wherein the storage devices are located in the data center.

13. The non-transitory, computer-readable storage medium of claim 11, wherein an administrator information handling system defines the one or more one or more arrays of the storage devices accesses.

14. The non-transitory, computer-readable storage medium of claim 11, wherein cloud service workload is migrated or cloned to another cloud service, and accesses the same arrays of the storage devices.

15. The non-transitory, computer-readable storage medium of claim 11, wherein the control plane maps and attaches volumes initiators of the compute resources.

* * * * *